United States Patent [19]

Newton et al.

[11] Patent Number: 4,925,148
[45] Date of Patent: May 15, 1990

[54] FISHING POLE HOLDER

[76] Inventors: Jerry Newton, R.R. B 3 Box 10, Owensburg, Ind. 47453; Chester Grogan, Jr., 3740 Woodyard Rd., Bloomington, Ind. 47401; George Spector, 233 Broadway #3815, New York, N.Y. 10007

[21] Appl. No.: 365,792

[22] Filed: Jun. 14, 1989

[51] Int. Cl.⁵ .................................................. F21I 7/00
[52] U.S. Cl. .................................. 248/542; 248/156; 248/530; 248/545
[58] Field of Search ............... 248/530, 532, 533, 538, 248/219.2, 511, 512, 513, 156, 520, 545, 542

[56] References Cited

U.S. PATENT DOCUMENTS

| | | | |
|---|---|---|---|
| 2,603,900 | 7/1952 | Kellett | 248/500 X |
| 3,831,891 | 8/1974 | Jester | 248/545 X |
| 3,876,970 | 4/1975 | Schweitzer | 248/156 |
| 4,232,467 | 11/1986 | Stewart | 248/533 X |

Primary Examiner—Alvin C. Chin-Shue

[57] ABSTRACT

A fishing pole holder is provided and consists of a bracket attached to an elongated post having a pointed end adapted to be inserted into the ground near a body of water so that a portion of a fishing pole can be inserted and supported between the bracket and the post. A built-in flashlight is carried by the post for illuminating for night fishing. A mechanism carried on the post can visually indicate a hooked fish by flashing the flashlight when the fish pulls the fishing pole.

1 Claim, 1 Drawing Sheet

FISHING POLE HOLDER

BACKGROUND OF THE INVENTION

The instant invention relates generally to fishing rod supports and more specifically it relates to a fishing pole holder.

Numerous fishing rod supports have been provided in prior art that are adapted to secure fishing rods on the banks of bodies of water so that they can be left unattended. For example, U.S. Pat. Nos. 2,293,305 to Oldham; 2,515,426 to Rodgers and 4,479,628 to Allbright all are illustrative of such prior art. While these units may be suitable for the particular purpose to which they address, they would not be as suitable for the purposes of the present invention as heretofore described.

SUMMARY OF THE INVENTION

A primary object of the present invention is to provide a fishing hole holder that will overcome the shortcomings of the prior art devices.

Another object is to provide a fishing pole holder that can hold fishing gear thereon and stabilize a fishing pole thereto so that the fishing pole can be used along a river bank, lake and pond during the day and at night.

An additional object is to provide a fishing pole holder that will contain a mechanism which will activate a flasher light when a fish is hooked to the fishing pole.

A further object is to provide a fishing pole holder that is simple and easy to use.

A still further object is to provide a fishing pole holder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
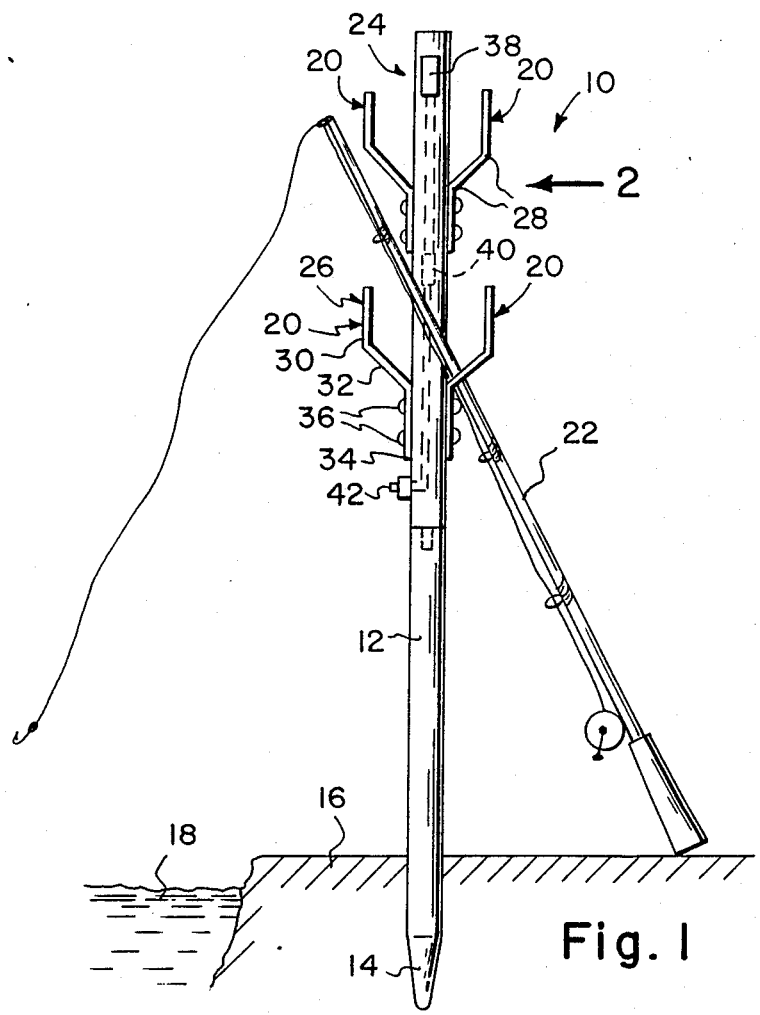
FIG. 1 is an elevational view of the invention.

Turning now descriptively to the drawings, in which similar reference characters denote similar elements throughout the several views, FIG. 1 illustrates a fishing pole holder 10 that consists of an elongated post 12 having a pointed end 14 adapted to be inserted into the ground 16 near a body of water 18, such as a river, lake, pond or the lake. Brackets 20 are attached to the post 12 opposite the pointed end 14 and each are adapted to engage a portion of a fishing pole 22 when inserted between the bracket 20 and the post 12. The fishing pole 22 can be used for hooking fish when unattended. A built-in flashlight 24 is carried by the post 12 for illuminating the holder 10 for night fishing.

Figure 2:
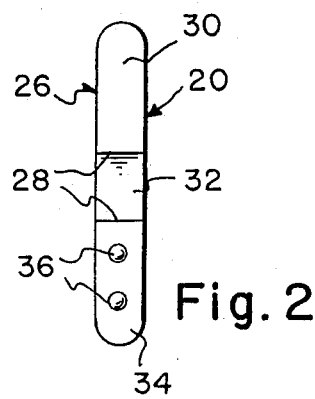
FIG. 2 is an enlarged front view of one of the brackets as taken in direction of arrow 2 in FIG. 1.

As best seen in FIGS. 1 and 2, each bracket 20 includes a blade member 26 bent transversely in two spaced apart places 28 to form three portions 30, 32 and 34. The two end portions 30 and 34 are parallel to each other while the middle portion 32 is bent at an angle therebetween. Fasteners 36, such as rivets, nails, screws or the like are for attaching end portion 34 of the blade member 26 to the post 12 so that other end portion 30 will be positioned at a parallel distance away from the post 12.

Figure 3:
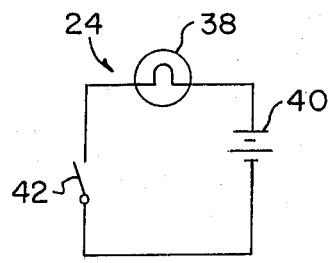
FIG. 3 is an electrical diagram of the circuit for the light in FIG. 1.

The built-in flashlight 24, as shown in FIGS. 1 and 3, includes an electric light 38 carried on side of the post 12 opposite the pointed end 14. A battery 40 is carried within the post 12 and is electrically connected to the light 38. A manually operated switch 42 is carried on the post 12 and is electrically connected between the light 38 and the battery 40 so that a person can turn the light 38 on and off.

Figure 4:
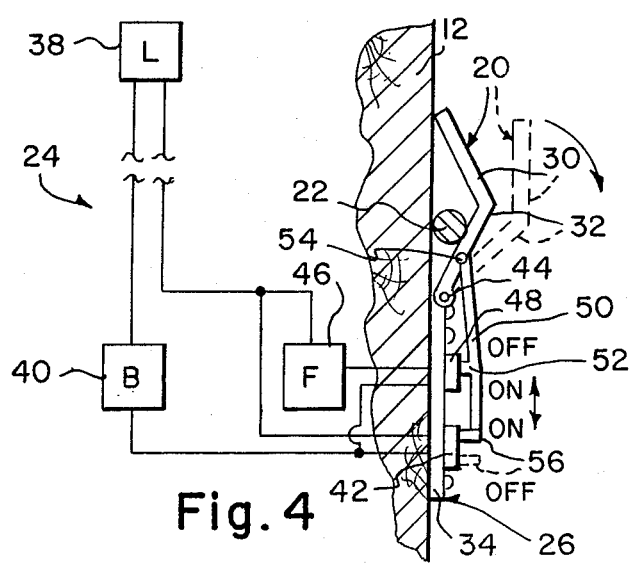
FIG. 4 is a diagrammatic view partly in section showing a modified bracket which is spring biased in a normally closed position against the post for holding the fishing pole thereto and an auxiliary flasher light circuit activated by movement of the fishing pole when a fish is hooked.

FIG. 4 shows a modification in which the blade member 26 has a normally closed spring biased hinge 44 between the middle portion and lower end portion 34 so that the fishing pole 22 can be securely holed therein. A flasher 46 is carried within the post 12 and electrically connected to the light 38. A normally off fish actuated switch 48 is carried on the post 12 on the lower end portion 34 of the blade member 26 above the manually operated switch 42 and is electrically connected between the light 38 and the battery 40. A movable arm 50 extends upwardly from lever 52 of the fish actuated switch 48 to a pivot point 54 on the middle portion 32 of the blade member 26. The arm 50 also extends downwardly to bear against lever 56 of the manually operated switch 42 when the manually operated switch is on. When a hooked fish pulls the fishing pole 22 the movable arm 50 will turn the fish actuated switch 48 on and the manually operated switch 42 off to activate the flasher 46 to indicate visually that the fish is hooked.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A fishing pole holder comprising:
   (a) an elongated post having a pointed end adapted to be inserted into the ground near a body of water;
   (b) at least one bracket attached to said post opposite said pointed end adapted to engage a portion of a fishing pole when inserted between said bracket and said post so that the fishing pole can be used for hooking a fish when unattended; and
   (c) means carried by said post, for illuminating said holder for night fishing; wherein said bracket includes:
   (d) a blade member bent transversely in two spaced apart places to form a middle portion and two end portions wherein said middle portion is at an angle to each of said end portions and;
   (e) at least one fastener for attaching one of said end portions of said blade member to said post so that other of said end portions will be positioned to provide space between the said pole and said middle portion for receiving said pole therebetween; wherein said illuminating means includes:

(f) an electric light carried on side of said post opposite said pointed end.

(g) a battery carried within said post and electrically connected to said light; and (h) a manually operated switch carried on said post and electrically connected between said light and said battery so that a person can turn said light on and off; further including:

(i) said blade member having a normally closed spring biased hinge between said middle portion and lower of said end portions whereby said middle portion is normally biased towards said pole to engage and retain said pole against said holder;

(j) a flasher carried within said post and electrically connected to said light;

(k) a normally off fish actuated switch carried on said post on said lower of said end portions of said blade member above said manually operated switch and electrically connected between said light and said battery and (l) a movable arm extending upwardly from lever of said fish actuated switch to a pivot point on said middle portion of said blade member and extending downwardly to bear against lever of said manually operated switch when said manually operated switch is on so that when a hooked fish pulls the fishing pole said movable arm will turn said fish actuated switch on and said manually operated switch off to activate said flasher to indicated visually that the fish is hooked.

* * * * *